March 11, 1969  E. V. JACKSON  3,432,195
RELEASABLE LOCKING LATCH
Filed May 27, 1966

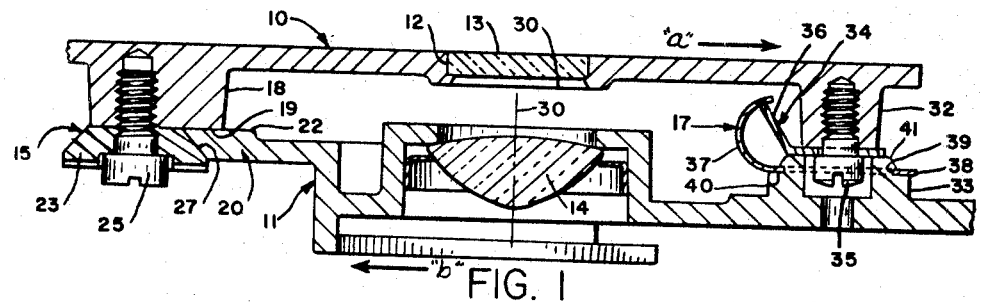
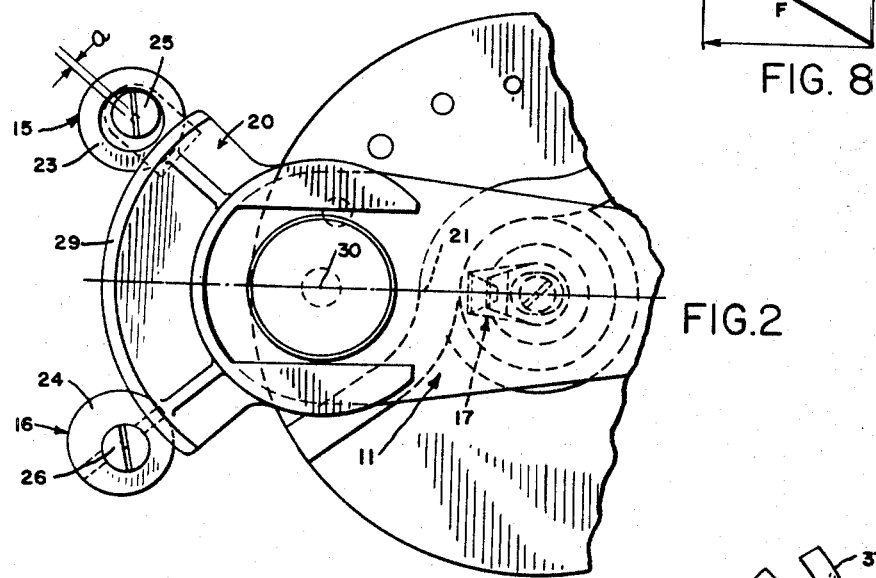
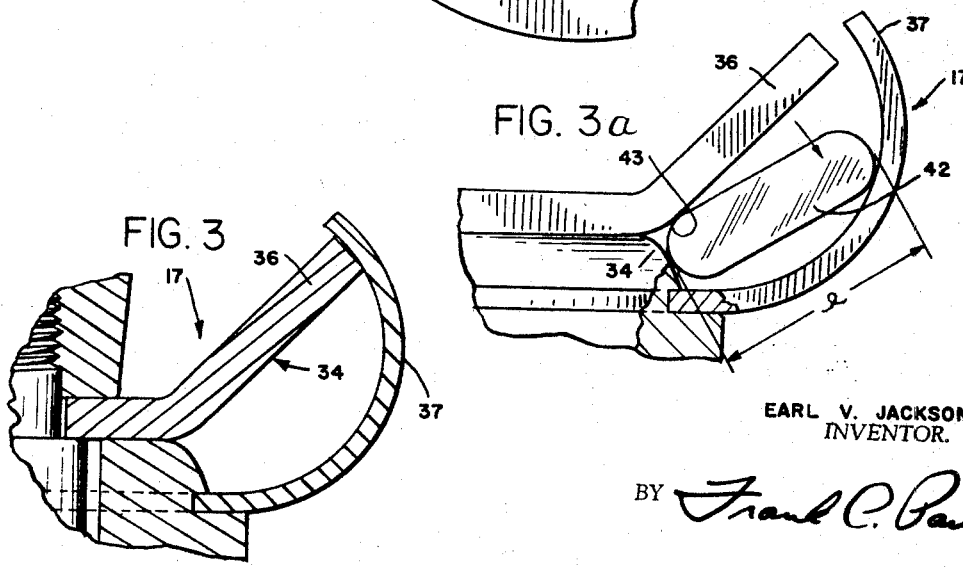

EARL V. JACKSON
INVENTOR.
BY
ATTORNEY

United States Patent Office 3,432,195
Patented Mar. 11, 1969

3,432,195
RELEASABLE LOCKING LATCH
Earl V. Jackson, Penfield, N.Y., assignor to Bausch & Lomb Incorporated, Rochester, N.Y., a corporation of New York
Filed May 27, 1966, Ser. No. 553,513
U.S. Cl. 287—189.36
Int. Cl. F16b *1/00;* G02b *21/06*
4 Claims

ABSTRACT OF THE DISCLOSURE

An automatically locking spring latch which cooperates with other joining means to lock together two adjacent parts of an apparatus, one part of the apparatus being demountable from the other by use of a spring lock releasing tool.

---

The present invention relates to means for releasably locking together two adjacent members of a device and more particularly it relates to an unauthorized use preventing type of lock for use of microscope mechanism and similar devices.

Microscopes for instance are built for use in a great variety of activities which are conducted by school personnel and students, many of whom have little or no training in the use of scientific instruments. Consequently, such instruments are often misused and abused by careless or negligent users who needlessly disassemble parts of the microcope, such as the microscope substage parts. In the substage subassemblies of the microscopes are held the condenser lenses for the substage illuminator, as well as the diaphragming devices for the illuminating beam and various filters and tint plates. The condenser lenses must be optically and mechanically aligned with the optical axis of the microscope since easy demountability of the substage is not particularly desirable since it increases the chances of misalignment of the joining parts.

It is an object of the present invention to provide means for releasably locking and securing one part of an instrument on an adjacent part, the locking means being so constructed that disassembly thereof is difficult enough to discourage unauthorized changes of the auxiliary mechanism.

A further object of the invention is to provide such a locking device which is reliable and easy to assemble quickly, but nevertheless capable of uniting two adjoining members in good relative alignment repeatedly, and additionally provide means for adjusting said alignment.

Further objects and advantages reside in the form and arrangement of the device and in the details in construction thereof, said advantages being brought out in the following specification and illustrated in the accompanying drawings, wherein:

FIG. 1 is a midsectional view of a mechanism incorporating one form of the present invention;

FIG. 2 is a bottom plan view of the mechanism shown in FIG. 1, parts thereof being broken away;

FIG. 3 is an enlarged fragmentary midsectional view partly broken away showing certain details of the mechanism shown in FIG. 1;

FIG. 3a is a midsectional view of the mechanism shown in FIG. 3 showing a second operating position thereof;

FIG. 8 is a force diagram which is explanatory of FIG. 1.

Figure 6:
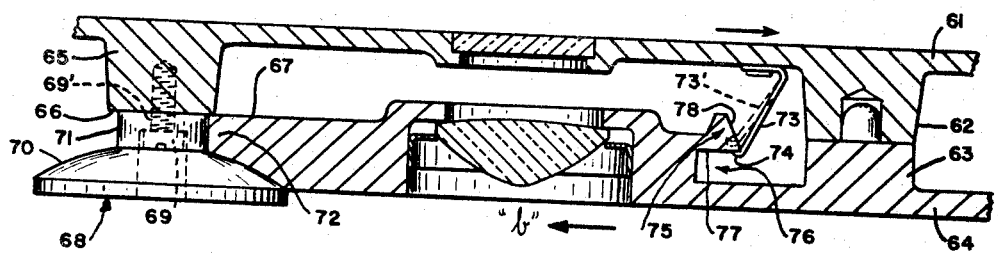
FIG. 6 is a sectional view similar to FIG. 1 showing a fourth form of the present invention.

Although it is contemplated that the present invention may be applied to a considerable variety of composite scientific instruments and other devices, it is described herebelow particularly as a part of a microscope stage and its accessory substage which are designated generally by numerals 10 and 11 respectively in FIGS. 1 and 2.

The stage is provided centrally with an opening 12 wherein a transparent window 13 is suitably fixed in optical alignment with a light condenser 14 which is secured in said substage 11 therebelow in a conventional manner.

According to the present invention, means are provided for mounting and locking the substage 11 on the main stage 10 releasably in good mechanical and optical alignment therewith.

For all of the forms of mounting mechanism disclosed hereinbelow, there are three points of contact or support between the stage 10 and its substage 11 including preferably two stationary but adjustable abutments which are generally indicated by numerals 15 and 16 and a latch mechanism 17. As shown in FIGS. 1 and 2, each abutment member 15 or 16 is built in the form of an open-sided joint or socket which in the illustrated form of the invention comprises a boss 18 projecting downwardly from the underside of the stage 10, said boss terminating in a substantially flat bottom surface 19. A companion side projecting boss 20 is formed in the same manner on the substage 11 at a fixed distance from boss 18 in a direction approximately normal to the longitudinal axis 21 of said stage, the boss 20 being provided with a flat horizontal surface 22.

Against the end surface 19 of the boss 18 is secured a pair of retaining disks 23 and 24 respectively by means of a pair of cap screws 25 and 26 individually. Each of the disks 23 and 24 has formed thereon a truncated conical operating surface, one of which is numbered 27 in FIG. 1, and each truncated surface together with one of the flat surfaces 19 and 22 provides an open-sided joint, socket or notch substantially of the pivot type wherein a companion member may engage.

As shown in the preferred form of the invention in FIG. 2, a tapered or chiseled-edged mounting lug 29 is formed on the substage 11 to engage in said sockets, said lug preferably being formed arcuately and continuously as a radial flange which is centered on the vertical optical axis 30 of the condenser 14. The advantages of such an arcuate configuration is that the centration of the condenser 14 with respect to the window 13 is established immediately upon assembly of one part to the other.

Furthermore, according to this invention, a novel latch generally designated by numeral 17 is provided between the stage 10 and substage 11 for two purposes which are:

(1) To hold the substage 11 in firm contact with the stage 10 in such a way that it is locked thereon semi-permanently.

(2) To simultaneously urge the substage mounting lug 29 into firm engagement within the sockets or abutment members 15 and 16.

The unsupported end of the stage 10 is vertically spaced from the dependent substage 11 by a pair of confronting bosses 32 and 33 formed on the stage and substage respectively so as to allow a small clearance space therebetween. In said space a rigid anchor member 34 of said novel latch mechanism 17 is secured to the bottom surface of the boss 32 by any preferred means such as a screw 35 which is threaded into said boss.

In order to achieve the aforementioned semi-permanently locking feature, the anchor member 34 is formed of flat relatively thick metal and is bent or otherwise manufactured to form an upstanding lug portion 36 thereon which projects angularly toward the adjacent stage 10. The cooperating part of the latch mechanism 17 is a spring tempered sheet metal curved hook 17 having a straight shank 38 wherein a large opening 39 is formed. On the lower boss 33 is formed an annular shoulder 40 around the boss below and parallel to the top surface of the boss 33. The shank of the spring hook 37 is seated on the shoulder 40 and is fixed thereon by suitable means such as upsetting the lip at 41 or otherwise as shown in FIG. 1.

The curved hook 37 engages near its outer end forcibly and under spring stress against the end of the anchor lug 36 as shown in FIG. 3. It will be noted that the spring hook 37, while it rests against the end of the lug portion 36, exerts a lateral pressure in the direction of the arrow b of the lug 29 against the conical surfaces, one of which is shown at 27. Since the curved hook 37 reaches across the top of the anchor lug 36 when in assembled position, it cannot be pulled apart and the stage 10 and substage 11 are effectively locked together until released by a special tool as mentioned hereinafter.

During assembly of the locking or latching device 17, the tip of the hook 37 engages the inclined side of the lug 36 and is progressively flexed outwardly as the tip of the hook advances along said lug until it snaps over the end thereof. The build-up of stresses in the anchor lug 36, spring 37 and surrounding parts may be represented by the force diagram in FIG. 8 wherein the force F represents the stress which maintains the parts 15 and 16 in contact with the lug 29.

For the purpose of correctly aligning the center point of the radius of the circular flange or lug 29 with the longitudinal center axis 21 and vertical axis 30 of the stage 10, the disks 23 and 24 are held by cap screws 25 and 26 respectively which are mounted eccentrically to said disks. Therefore, centering may be accomplished by selectively adjusting the disks angularly sufficiently to correctly align the center point of the radius with the center line of the stage 10.

In FIG. 3a is shown the typical unlocked position of the locking mechanism 17 together with mechanism for accomplishing the unlocking function. An unlocking tool, not shown, is provided having a flattened tip 42 which is constructed with dimensions such that it fits somewhat loosely in the open space between the anchor lug 36 and spring hook 37. While it is necessary that the unlocking or releasing tool 42 be of such a size as to easily enter said open space, it should nevertheless have a sufficient transverse dimension e to bear as near as practicable to the tip of the hook 37. When operating the release tool, one side of the tool tip 42 is seated at 43 against the butt portion of the anchor lug 34 while the other side pivots about it during application of torque thereto as indicated by the arrow. In all cases, it is required that the surrounding stage structure be so constructed as to allow access of the tool 42 to the space wherein the tool operates.

The present invention as aforementioned may be constructed in many different forms without departing from the logical teachings thereof and several of such forms are described herebelow.

Figure 4:
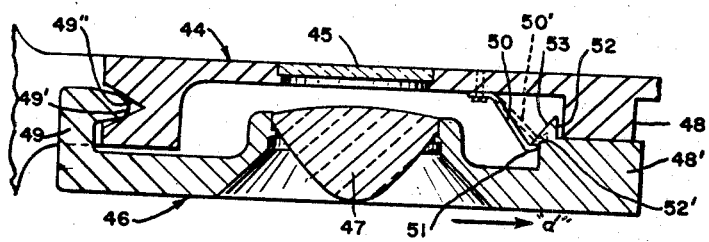
FIG. 4 is a view similar to FIG. 1 showing a second form of the present invention.

According to a second form of the present invention, as shown in FIG. 4, the three attachment mechanisms are reversed in direction so that the substage mechanism is tensionally stressed instead of compressively as in the form of the invention shown in FIG. 1.

In FIG. 4, a stage 44 is provided having an opening therethrough wherein a window 45 is secured in any suitable manner. A substage 46 is provided beneath the stage 44 having mounted therein a condenser lens 47 in alignment with the window 45. The stage 44 is held in spaced relation to the substage 46 partially by a pair of confronting and contacting bosses 48 and 48' formed respectively on the stage and substage.

A pivoted type of attachment mechanism is provided for clamping the rear edge of the substage 46 onto the stage 44, and such mechanism comprises a pair of upstanding lugs, one of which is shown at 49, formed on said rear edge. On the front side of each of said lugs is formed a rounded nose 49' which engages in a confronting preferably V-shaped notch 49" formed in the rear edge of the stage 44.

Latch means are provided near the front portion of the substage 46 having a different form than latch mechanism 17 of FIG. 1 but having the same purpose and action generally. Said latch means comprises a spring hook 50 which is fixed as shown in FIG. 4 or otherwise to the underside of the stage 44 and said hook projects angularly forwardly and downwardly for a purpose to be disclosed hereinafter. The tip portion of the hook 50 is curled to form a smooth working edge 51.

On the lower boss 48' is saliently formed an anchor lug 52 whereon is formed a horizontal shoulder 52' in engageable relation to the edge 51 of hook 50. Facing said hook, an inclined smooth striking surface 53 is formed on the anchor lug 52 which terminates along its lower edge at said shoulder 52'. In all variations of this second form of the invention, sufficient clearance space must be provided around the spring hook 50 to allow deflection thereof to a released position indicated by dotted line 50'.

In assembling the substage 46 to the stage 44, the nose 49' is first engaged with the notch 49" and subsequently the front end of the substage is swung upwardly while maintaining the nose 49' in contact with said notch. When the smooth striking surface of the anchor lug 52 is contacted by the spring hook 50, it is considerably deflected thereby from its relaxed position 50' and the spring stress built up in the hook causes the rounded tip 51 to snap into assembled position beneath the shoulder 52'. At that moment, there exist in the spring hook an oblique resultant force which simultaneously, (1) forces the nose 49' into the notch 49", and (2) exerts an upward force to hold the substage onto the stage as explained heretofore in connection with FIG. 1. Release of the spring hook 50 is effected similarly to the release described in connection with FIG. 3a.

Figure 5:
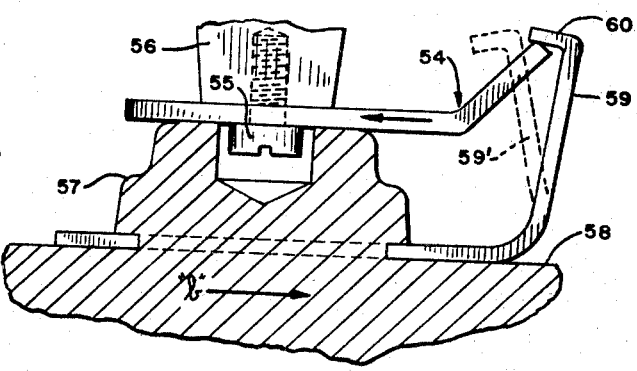
FIG. 5 is a view similar to FIG. 3 showing a third form of the present invention.

A third form of the latch mechanism is shown in enlarged detail in FIG. 5 wherein a rigid angularly formed lug 54 is fixed by means of a cap screw 55 onto a depending boss 56 formed on a microscope stage, not shown. Mounted on an underlying boss 57 formed on the substage 58 is a resilient flat metal latch 59 which reaches laterally and upwardly to the tip end of the rigid lug 54. On the upper end of the latch 59 is formed a hook 60 which engages over the tip end of the rigid lug 54 by reason of the spring stress therein to hold the substage against the stage. In relaxed or normal idle position, the spring latch 59 occupies the dotted line position 59'.

When pressure is applied in this way to the end of the aforementioned spring latch 59, two effects are seen, i.e., primarily, the substage 58 is clamped semi-permanently up against the overlying boss 56 on the stage until unlatched by a special tool similar to that which is shown in FIG. 3a. In assembling, the latch 59, which is initially in the position 59', first engages the inclined underside or striking surface of the lug 54 and is moved therealong until the tip 60 snaps over the end of lug 54. Secondarily, at this time a lateral force indicated by arrow b is induced in substage 58 to secure good engagement of the aforesaid socket joint which includes the engaged surfaces 49' and 49" as shown in FIG. 4, the same as in the other forms of the present invention.

Another form of the invention is shown in FIG. 6 wherein the aforesaid open-sided joint and spring latch are shown as an operative combination. Herein is shown a microscope stage 61 having two forward abutting bosses 62 and 63 which contact each other when assembled, said bosses being formed on the stage 61 and a substage 64 respectively. On the rear end of the stage 61 is formed a depending boss 65 having a lower surface 66 against which an upper clamping surface 67 of the substage 64 is adapted to be seated.

Against the surface 66 of the boss 65 is secured a round support button 68 by means of a screw 69 which is threaded into the boss 65 and passes through an eccentric hole 69' formed in said button. On said button 68 is formed an inclined support surface 70 which is separated from the seating surface 67 by a neck portion 71 so as to form a reentrant socket or notch wherein the adjacent parts of the substage 64 may be held as shown in FIG. 6.

In order to latch the substage 64 into contact with the stage 61 after rear end 72 of the substage has been engaged with the button 68, a metallic spring latch 73 is provided which is fixed on the underside of said stage 61 in any desired manner in an interlying space provided between stage and substage. The spring latch 73 is provided with a terminal hook 74 which is adapted to engage over the nose of an anchor lug 75 formed on the substage 64 in alignment with said hook. As formed, the nose of the lug 75 overhangs a clearance opening 76 in the substage so that the hook 74 engages with a lower substantially horizontal surface 77 thereon and presses upwardly as well as laterally against it as shown in FIG. 8.

On the upper side of the nose of the lug 75 is formed an inclined or beveled lead surface 78 along which the tip 74 of the spring hook 73 moves during the assembly operation of the latch mechanism, the normal unstressed position of the hook being shown in dotted lines at 73'. The double action or twin purposes of the hook 73 is evident from FIG. 6 wherein the arrow b shows one component of thrust induced by the spring hook 73 whereby the rear portion of the substage is firmly seated against the button 68 as the hook reaches locking engagement with the lug 75, thus resulting in good optical alignment of the optical parts of the stage and substage.

Release of the hook 73 is effected by placing the release tool 42 between the inclined surface 78 and the hook 73 and twisting the tool.

Figure 7:
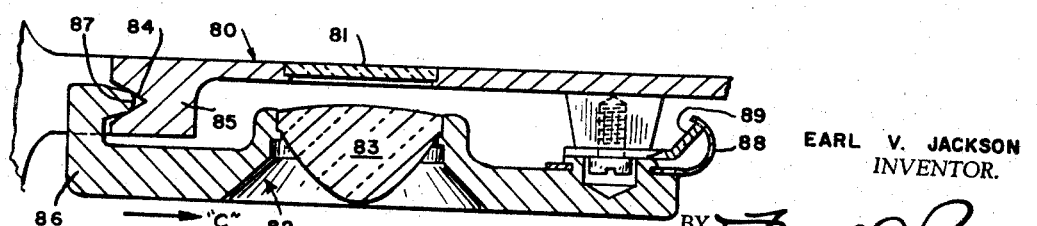
FIG. 7 is a sectional view similar to FIG. 1 showing a fifth form of said invention.

Still another form of the invention is shown in FIG. 7 of the drawings wherein a stage 80 is provided having a transparent stage plate or window 81 formed therein. Mounted therebelow is a substage 82 having a condensing lens 83 secured therein in optical alignment with said window 81. In order to establish said alignment, an extended angular notch 84 is formed horizontally across the rear face of a rear boss 85 which is preferably integrally formed on said stage.

On the rear end of the substage 82 is formed an offset flange 86 having a forwardly projecting rounded nose 87 which engages with the notch 84 for pivotal movement of the substage thereabout. The engagement of the nose 87 with the notch 84 automatically axially aligns the lens 83 with the window 81 at the moment that the stage and substage are latched together.

Of greatest importance is the novel latch mechanism which is substantially a duplicate of that shown in FIG. 1 except that it is reversed in direction. Therefore a detailed description of the latch mechanism is deemed to be unnecessary and it is only necessary to point out that the spring hook 88 bears yieldably against the rigid anchor lug 89 with a force having a strong component in the direction of the arrow "c" so that the joint, composed of notch 84 and nose 87 is held assembled when the latch mechanism is engaged. Release of the latch mechanism is accomplished in the same manner as described in connection with FIG. 1.

It is here pointed out that in all of the described forms of the present invention, one member is joined to another by two supports. One support is a demountable open joint and the other is a prestressed preloaded latch mechanism which provides a load component which holds the two members in assembled position semi-permanently. All may be unlocked by the use of the special unlocking tool 43.

Although only certain forms of the present invention have been shown and described, other forms and arrangements are possible, and changes may be made in the combination and arrangements thereof and in the details of construction thereof without departing from the spirit of the invention.

What is claimed is:

1. Means located at two mutually spaced locations for releasably locking together two adjacent members, said means having in combination
    an open-sided pivot type separable joint formed cooperatively on the contiguous elements of said members at one of said locations, the joint being held in assembled position by pressure applied to one element of the joint in a direction toward the other element,
    a pair of mutually spaced confronting walls formed respectively on said members so as to define a closed intervening space therebetween,
    a substantially rigid anchor lug formed on and protruding freely from one of said members toward the other member at a distance from said joint and located in said space,
    an abutment surface formed on the free end of said lug,
    an inclined lead surface formed on said lug and terminating on one side thereof substantially at said abutment surface,
    a strong resilient hook fixed on said other member in a position to operatively engage said anchor lug after the parts of said joint are engaged, said hook having a terminal portion projecting initially into engagement with said inclined surface and finally into latching engagement with said abutment surface due to bending of said hook to lock the joint in assembled position, said hook being operatively so shaped that transverse deflection thereof results in applying said pressure upon said lug in a direction to lock said joint assembled.

2. Means for releasably locking a first member in a fixed position on a confronting second member as set forth in claim 1, one of the members being fixed and the other being demountable relative thereto, said means being further characterized by
    said anchor lug being formed on the fixed member and said resilient hook being fixed on said demountable member.

3. Means for releasably locking a first member in a fixed position on a confronting second member as set forth in claim 1, said means being further characterized by
    said resilient hook being strongly constructed in circular form which partly encircles said anchor lug so that the inner surface of said hook contacts said abutment surface on said lug about normal thereto and additionally a longitudinal force substantially normal to the locking force is transmitted to said joint whereby said joint is held in assembled position.

4. Means applied at two mutually spaced locations for releasably locking together two adjacent members as set forth in claim 1 further characterized by said open-sided joint consisting of a pair of conical eccentrically pivoted buttons which are fixed in spaced relation to each other in one of said two adjacent members so as to form therewith reentrant surfaces, and
    an arcuate flange formed on the other of said members and fitted to said reentrant surfaces, the center of curvature of said arcuate flange being a fixed point on said other member whereby rotational adjustment of said buttons causes said fixed point to be displaced with reference to a second fixed point located on the first member.

References Cited
UNITED STATES PATENTS

| | | | |
|---|---|---|---|
| 2,113,687 | 4/1938 | Grace | 292—80 |
| 2,587,912 | 3/1952 | Simpson | 248—223 |
| 2,872,232 | 2/1959 | Lawson | 292—80 |

FOREIGN PATENTS 9,066  11/1906  Denmark.

CARL W. TOMLIN, *Primary Examiner.*

R. S. BRITTS, *Assistant Examiner.*

U.S. Cl. X.R.

350—87